United States Patent
Rajahalme

(10) Patent No.: US 10,361,899 B2
(45) Date of Patent: Jul. 23, 2019

(54) PACKET PROCESSING RULE VERSIONING

(71) Applicant: Nicira, Inc., Palo Alto, CA (US)

(72) Inventor: Jarno Rajahalme, Belmont, CA (US)

(73) Assignee: NICIRA, INC., Palo Alto, CA (US)

( * ) Notice: Subject to any disclaimer, the term of this patent is extended or adjusted under 35 U.S.C. 154(b) by 708 days.

(21) Appl. No.: 15/007,191

(22) Filed: Jan. 26, 2016

(65) Prior Publication Data

US 2017/0091258 A1    Mar. 30, 2017

Related U.S. Application Data

(60) Provisional application No. 62/235,545, filed on Sep. 30, 2015.

(51) Int. Cl.
| | |
|---|---|
| *H04L 29/06* | (2006.01) |
| *H04L 12/715* | (2013.01) |
| *H04L 12/741* | (2013.01) |
| *H04L 12/757* | (2013.01) |
| *H04L 12/755* | (2013.01) |
| *H04L 12/721* | (2013.01) |

(52) U.S. Cl.
CPC ............ *H04L 29/06* (2013.01); *H04L 45/021* (2013.01); *H04L 45/023* (2013.01); *H04L 45/38* (2013.01); *H04L 45/54* (2013.01); *H04L 45/64* (2013.01)

(58) Field of Classification Search
CPC ......... H04L 29/06; H04L 45/38; H04L 45/54; H04L 45/64; H04L 45/021; H04L 45/023
See application file for complete search history.

(56) References Cited

U.S. PATENT DOCUMENTS

| | | | | |
|---|---|---|---|---|
| 8,627,448 | B2 * | 1/2014 | Santos | H04L 63/0263 726/13 |
| 9,338,094 | B2 * | 5/2016 | Kotha | H04L 45/745 |
| 9,401,772 | B2 * | 7/2016 | Chiba | H04L 49/3009 |
| 9,515,873 | B2 * | 12/2016 | Anumala | H04L 47/10 |
| 9,712,431 | B2 * | 7/2017 | Lee | H04L 45/38 |
| 9,742,657 | B2 * | 8/2017 | Narayanan | H04L 45/021 |

(Continued)

OTHER PUBLICATIONS

Luo, Shouxi, Hongfang Yu, and Lemin Li. "Consistency is not easy: How to use two-phase update for wildcard rules?." IEEE Communications Letters 19.3 (Mar. 2015): 347-350. (Year: 2015).*

(Continued)

*Primary Examiner* — Patrice L Winder
(74) *Attorney, Agent, or Firm* — Adeli LLP

(57) ABSTRACT

Some embodiments provide a method for a managed forwarding element that processes packets through a set of packet processing tables by matching rules in the tables. The method receives an update that requires modification to at least one of the packet processing tables. Each rule in the packet processing tables is assigned a range of packet processing table versions in which the rule is valid for processing packets. The method modifies the packet processing tables according to the received update by at least one of (i) modifying the range of packet processing table versions in which an existing rule is valid to end after a current packet processing table version and (ii) adding a new rule with a range of valid packet processing table versions that begins with a next packet processing table version. The method increments the current version of the packet processing tables to commit the modifications.

24 Claims, 10 Drawing Sheets

(56) References Cited

U.S. PATENT DOCUMENTS

| | | | | |
|---|---|---|---|---|
| 9,887,878 B2* | 2/2018 | Mahajan | ............... | H04L 41/082 |
| 10,009,261 B2* | 6/2018 | Zhang | .................... | H04L 45/28 |
| 2015/0256465 A1* | 9/2015 | Mack-Crane | ........... | H04L 41/12 |
| | | | | 709/232 |
| 2015/0304215 A1* | 10/2015 | Nakamoto | .......... | H04L 12/4625 |
| | | | | 370/392 |
| 2017/0034058 A1* | 2/2017 | Sampath | ............. | H04L 12/6418 |
| 2017/0093686 A1* | 3/2017 | Uttaro | ................... | H04L 45/021 |

OTHER PUBLICATIONS

Katta, N. P., Rexford, J., & Walker, D. (Aug. 2013). Incremental consistent updates. In Proceedings of the second ACM SIGCOMM workshop on Hot topics in software defined networking (pp. 49-54). ACM. (Year: 2013).*

Reitblatt, Mark, Nate Foster, Jennifer Rexford, Cole Schlesinger, and David Walker. "Abstractions for network update." ACM SIGCOMM Computer Communication Review 42, No. 4 (Aug. 2012): 323-334. (Year: 2012).*

Casado, Martin, Nate Foster, and Arjun Guha. "Abstractions for software-defined networks." Communications of the ACM 57.10 (2014): 86-95. (Year: 2014).*

* cited by examiner

US 10,361,899 B2

PACKET PROCESSING RULE VERSIONING

BACKGROUND

Software Defined Networking (SDN) in general, and OpenFlow in particular, describe a system where a controller installs packet processing rules into a forwarding element (e.g., a software or hardware switch). In all but the simplest examples, the rules form a packet processing pipeline, a series of matches and actions that determines the fate of a packet being processed. Consistency—making sure each packet is processed by a consistent set of rules, rather than a mixture of old and new rules—has been a long standing problem in the field. This problem was addressed in the OpenFlow specification version 1.4, that specifies the control signaling for "bundles", or OpenFlow transactions. OpenFlow bundles have an optional "atomic" flag, that instructs the switch to commit the flow modifications of the bundle so that no packet being processed is handled by a mixture of old rules (ones being removed or modified by the flow modifications in the bundle) and new rules (ones being added or modified by the flow modifications in the bundle). The support for this "atomic" flag is optional to implement in the switch. The reason for this is that providing datapath atomicity without performance degradation is a hard problem to solve.

Implementing atomic flow table transactions is significant in the sense that with it we can provide hard security guarantees that would otherwise be only probabilistic in nature. Specifically, in all existing OVS-based system releases there exists a small window of inconsistency between the start and end of a set of flow table modifications issued by the controller. It is possible to further minimize the effect of the inconsistency by carefully crafting the order in which the modifications are performed, but in the general case such inconsistency can not be completely removed by such techniques.

BRIEF SUMMARY

Some embodiments of the invention provide a method for ensuring that individual packets processed through a series of packet processing tables in a managed forwarding element (MFE) are treated consistently even as the tables are modified. Specifically, some embodiments maintain a version number that increments each time modifications are made to the set of packet processing tables used to process packets in the MFE. When the MFE begins processing a particular packet, the MFE assigns the current version to the packet, which is maintained throughout the processing of that packet even if the current version for the MFE changes during processing (due to the packet processing tables being modified). Each entry in the packet processing tables (a "rule" or "flow entry") includes a range of versions for which the entry is valid, and the MFE only allows the packet to match entries that include the version number assigned to the packet within their valid range.

Some embodiments define the validity range by appending to each packet processing table entry a first version number (the addition version) indicating when that rule was added to the packet processing table and a second version number indicating when the rule is to be removed from the packet processing table (the removal version). When a rule is initially added, the addition version for that rule is the current version number plus one, and the removal version is the maximum version number (some embodiments use a large enough version number (e.g., 64 bits) such that it can be assumed that the maximum version number will not be reached). To remove a rule, the MFE modifies the removal version for the rule to be the current version number plus one. In some embodiments, once all packets having a particular version number are fully processed by the MFE, the MFE purges the rules with that particular version number as their removal version.

To modify an existing rule, the MFE removes the existing rule (by modifying its removal version) and adds the new, modified rule as a separate table entry having the same match conditions and priority. Because the version range of the two rules is non-overlapping, only one of the rules will be valid for any given packet, so the MFE will never have to choose between two matching, equal priority rules.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
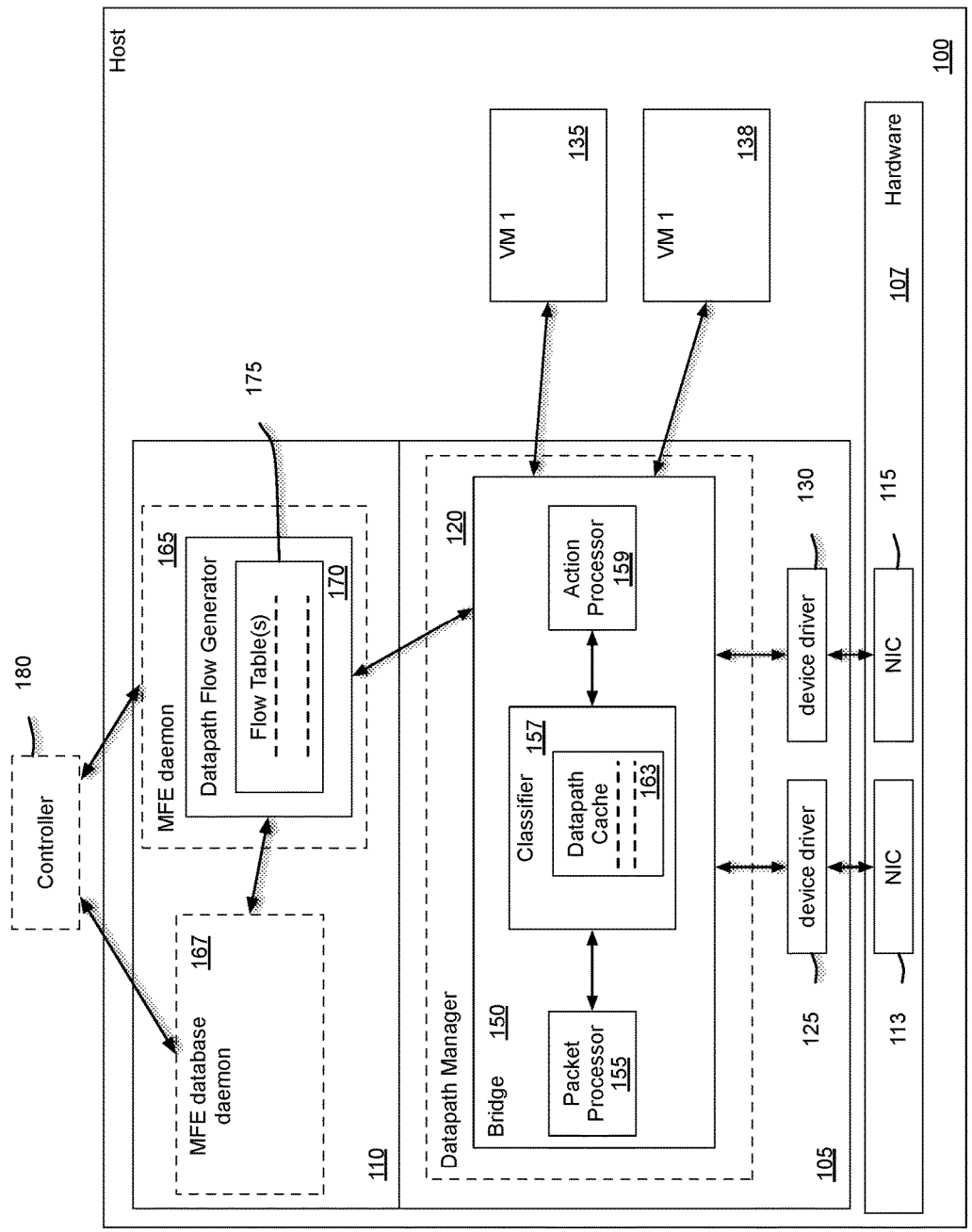
FIG. 1 conceptually illustrates an architectural diagram of a host machine on which a software-implemented MFE of some embodiments operates.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments of the invention provide a method for ensuring that individual packets processed through a series of packet processing tables in a managed forwarding element (MFE) are treated consistently even as the tables are modified. Specifically, some embodiments maintain a version number that increments each time modifications are made to the set of packet processing tables used to process packets in the MFE. When the MFE begins processing a particular packet, the MFE assigns the current version to the packet, which is maintained throughout the processing of that packet even if the current version for the MFE changes during processing (due to the packet processing tables being modified). Each entry in the packet processing tables (a "rule" or "flow entry") includes a range of versions for which the entry is valid, and the MFE only allows the packet to match entries that include the version number assigned to the packet within their valid range.

Some embodiments define the validity range by appending to each packet processing table entry a first version number (the addition version) indicating when that rule was added to the packet processing table and a second version number indicating when the rule is to be removed from the packet processing table (the removal version). When a rule is initially added, the addition version for that rule is the current version number plus one, and the removal version is the maximum version number (some embodiments use a large enough version number (e.g., 64 bits) such that it can be assumed that the maximum version number will not be reached). To remove a rule, the MFE modifies the removal version for the rule to be the current version number plus one. In some embodiments, once all packets having a particular version number are fully processed by the MFE, the MFE purges the rules with that particular version number as their removal version.

To modify an existing rule, the MFE removes the existing rule (by modifying its removal version) and adds the new, modified rule as a separate table entry having the same match conditions and priority. Because the version range of the two rules is non-overlapping, only one of the rules will be valid for any given packet, so the MFE will never have to choose between two matching, equal priority rules.

The above describes the packet processing rule versioning of some embodiments. The following sections describe the multi-stage packet processing and assignment of version number ranges to flow entries in greater detail. Section I describes a flow-based managed forwarding element of some embodiments. Section II then describes the assignment of version number ranges and packet processing using those version number ranges. Finally, Section III describes an electronic system with which some embodiments of the invention are implemented.

I. Managed Forwarding Element Architecture

The invention of some embodiments pertains to a flow-based managed forwarding element (MFE), such as Open vSwitch (OVS) or other flow-based software MFEs. However, in other embodiments, the invention pertains to a rule-based MFE such as a datapath development kit (DPDK)-based managed forwarding element. The rule-based MFEs of some embodiments use a configuration database that stores the rules (e.g., in database tables) against which packets are matched by the MFE. For the purposes of rule versioning, this configuration database operates similarly to the flow tables of a flow-based MFE of some embodiments. In either case, it should be understood that the packet processing tables used by the MFE may include rules for various types of packet processing operations, including both physical and logical forwarding, ingress and egress ACL rules, rules for services such as network address translation, logical topology operations such as logical to physical (or vice versa) port mapping, etc. That is, the packet processing tables of some embodiments include both forwarding tables as well as tables of rules for other operations.

FIG. 1 conceptually illustrates an architectural diagram of a host machine 100 on which a software-implemented flow-based MFE of some embodiments operates. In some embodiments, the MFE is implemented in the virtualization software (e.g., in the hypervisor) of the host 100. In this example, the MFE includes several components, including a datapath manager 120 as well as a MFE daemon 165 and MFE database daemon 167. In some embodiments, the datapath manager 120 operates in a kernel of the virtualization software while the MFE daemon 165 and the MFE database daemon 167 both operate in the user space of the virtualization software.

As shown in FIG. 1, the host 100 includes hardware 107 (though this is a software architecture diagram, the hardware 107 is displayed in order to represent the NICs 113 and 115 of the host machine), virtualization software kernel 105, virtualization software user space 110, and two VMs 135 and 138. The hardware 107 may include typical computer hardware (e.g., processing units, volatile memory (e.g., RAM), nonvolatile memory (e.g., hard disk, optical disks, solid-state memory, etc.), network adapters, etc. As shown, the hardware 107 also includes network interface controllers (NICs) 113 and 115 for connecting a computing device to a network.

The virtualization software is a software abstraction layer that operates on top of the hardware 107 and below any operating system in some embodiments. In some embodiments, the kernel of the virtualization software performs virtualization functionalities (e.g., to virtualize the hardware 107 for several virtual machines operating on the host machine). The kernel handles various management tasks, such as memory management, processor scheduling, or any other operations for controlling the execution of the VMs 135 and 138 operating on the host machine.

As shown, the virtualization software includes device drivers 125 and 130 for the NICs 113 and 115, respectively. The device drivers 125 and 130 allow an operating system to interact with the hardware of the host 100. The VMs 135 and 138 are independent virtual machines operating on the host 100, and may run any number of different operating systems (e.g., Linux, Solaris, FreeBSD, or any other type of UNIX based operating system, Windows-based operating systems, etc.).

The virtualization software also includes the MFE daemon 165 and the MFE database daemon 167. The MFE daemon 165 is an application that runs in the background of the virtualization software. The MFE daemon 165 of some embodiments receives configuration data from the network controller 180 (which may be a local chassis controller operating on the host 100, or a network controller operating on a separate physical machine to manage several host machines) and the MFE database daemon 167. For instance, from the controller, the MFE daemon 165 of some embodiments receives generated flow entries that specify packet processing operations to apply to packets when the packets match a set of conditions.

The MFE daemon 165 stores the received flow entries in the flow tables 175. In some embodiments, the flow tables are organized in stages (e.g., stages of packet processing), with one or more stages for each of several logical forwarding elements. For instance, a logical switch might have an ingress mapping stage, an ingress ACL stage, a logical forwarding stage, an egress ACL stage, etc.). For a MFE implementing multiple logical networks, each of the logical networks has several stages of flow tables in some embodiments. In addition, within a stage, several tables or sub-tables may be used if there can be matches over several different packet header fields. Each table (or sub-table) in some embodiments matches on a specific set of packet header fields. This allows the use of hash tables as an efficient mechanism to identify matching flow entries, with the specific set of packet header fields being hashed and looked up in the hash table corresponding to a table of similar flow entries. The flow entries in these flow tables are described in further detail below by reference to FIG. 2.

In some embodiments, the MFE daemon 165 communicates with the network controller 180 using the OpenFlow Protocol, while the MFE database daemon 167 communicates with the network controller 165 through a database communication protocol (e.g., OVSDB protocol). The database protocol of some embodiments is a JavaScript Object Notation (JSON) remote procedure call (RPC) based protocol.

The MFE database daemon 167 is also an application that runs in the background of the user space 110 in some embodiments. The MFE database daemon 167 of some embodiments communicates with the network controller 180 in order to configure certain aspects of the MFE (e.g., of the MFE daemon 165 and/or the kernel module 120) other than the installation of flow entries. For instance, the MFE database daemon 167 receives management information from the network controller 180 for configuring bridges, ingress ports, egress ports, QoS configurations for ports, etc., and stores the information in a set of databases that help define the configuration of the MFE.

As illustrated in FIG. 1, the MFE includes the datapath manager 120. datapath manager 120 processes and forwards network data (e.g., packets) between VMs and other data compute nodes running on the host 100 and network hosts external to the host (e.g., network data received through the NICs 113 and 115). In some embodiments, the VMs 135 and 138 running on the host 100 couple to the datapath manager through a bridge 150.

In some embodiments, the bridge 150 manages a set of rules (e.g., flow entries) that specify operations for processing and forwarding packets. The bridge 150 communicates with the MFE daemon 165 in order to process and forward packets that the bridge 150 receives. In the example of FIG. 1, the bridge 150 includes a packet processor 155, a classifier 157, and an action processor 159.

The packet processor 155 receives a packet and parses the packet to strip header values. The packet processor 155 can perform a number of different operations. For instance, in some embodiments, the packet processor 155 is a network stack that is associated with various network layers to differently process different types of data that it receives. Irrespective of all the different operations that it can perform, the packet processor 155 passes the header values to the classifier 157. In some embodiments, the packet processor stores these header values in one or more registers or metadata fields that are stored for a packet. In some embodiments, the packet processor 155 defines an object for the packet that includes the registers. The packet object is then used to represent the packet in the MFE.

The classifier 157 accesses one or more datapath caches 163 (also referred to as a flow cache) to find matching flow entries for different packets. For instance, in some embodiments, the classifier includes a flow aggregate cache that contains flow entries, each of which is matched by packets falling into a particular traffic aggregate class. That is, each of the flow entries in the aggregate cache specifies a subset of the packet header values for which it requires a match, with the other packet header fields being wildcarded (i.e., a packet can match the flow entry while having any values for the wildcarded fields). In some embodiments, each of the flow entries in the datapath cache 163 specifies an action for the action processor 159 to perform on packets that match the flow entries. These datapath cache flow entries are installed by the classifier 157, in some embodiments, based on processing of a packet through the set of flow tables 175 by the MFE daemon 165.

The classifier 157 also, or alternatively, includes an exact-match cache in some embodiments. The exact-match cache of some embodiments includes entries that are matched by packets belonging to specific data flows (using, e.g., a flow key of packet headers extracted from the packet that uniquely identifies a connection). In some embodiments, an exact-match cache entry includes the match conditions (e.g., the flow key) and either an action or a reference to one of the flow entries in the traffic aggregate cache. As such, multiple different exact-match entries might refer to the same cached flow entry (e.g., for similar data flows for the packets of which the forwarding element will perform the same action).

When the classifier 157 receives the header values for a packet, it first performs a check with the exact-match cache 153 to determine whether the packet belongs to a data flow that already has an entry in the cache 153. If a match is found in the exact-match cache, the classifier sends the packet to the action processor 159 with the action specified by the matched entry. When the packet does not belong to a data flow for which the exact-match cache already stores an entry, the classifier 157 performs a lookup on the aggregate flow cache to find a matching flow entry. When a matching flow entry is found in the aggregate flow cache, the classifier stores a new exact-match cache entry which can be used for subsequent packets that belong to the same data flow.

In certain cases, no matching flow entries can be found in the datapath cache (e.g., for the first packet of a data flow that does not share enough characteristics with other data flows). In these cases, the MFE shifts control of the packet processing to the MFE Daemon 165 for a full set of packet processing operations (i.e., executing of numerous lookup stages over the flow tables 175). One primary distinction between the cache 163 and the set of flow tables 175 is that there is at most only one matching flow entry for a packet in the cache 163. The cached flow entries specify all of the actions to take in order to process the packet, whereas each of the flow entries in the tables 175 only specify the actions for that stage, often specifying a resubmit action for processing by the next packet processing stage. After completing the processing for a packet, the classifier 157 sends the packet to the action processor 159. The action processor 159 performs the set of actions specified for the packet.

The MFE daemon 165 of some embodiments includes a datapath flow generator 170. The datapath flow generator 170 is a component of the MFE that makes forwarding and other packet processing decisions. For any packet that is not matched in the datapath cache 163 (e.g., because the packet is the first in a new transport-layer connection), the datapath flow generator 170 performs the one or more flow table lookups required to process the packet, and then generates a new flow entry to install in the cache 163. In some embodiments, the datapath flow generator includes or works in conjunction with a separate classifier (not shown) in order to find one or more matching flow entries in the flow tables 175. Unlike the classifier 157, the MFE daemon 165 may perform one or more resubmits (i.e., be resubmitted back to the classifier with packet data modified based on actions performed by previous matched flow entries).

It should be understood that the architecture shown in FIG. 1 is an example architecture and that different embodiments can include different sets of components. The naming of the various components is arbitrary and can change from one implementation to another. Also, the architecture shows two different layers (e.g., the kernel layer and the user space layer) performing various operations. In some embodiments, these operations occur at just one layer or are further split into other layers. For example, in the case of a DPDK-based MFE of some embodiments, both the multi-stage packet processing as well as datapath caches (e.g., the exact-match cache and the traffic aggregate cache) take place in the user space.

Figure 2:
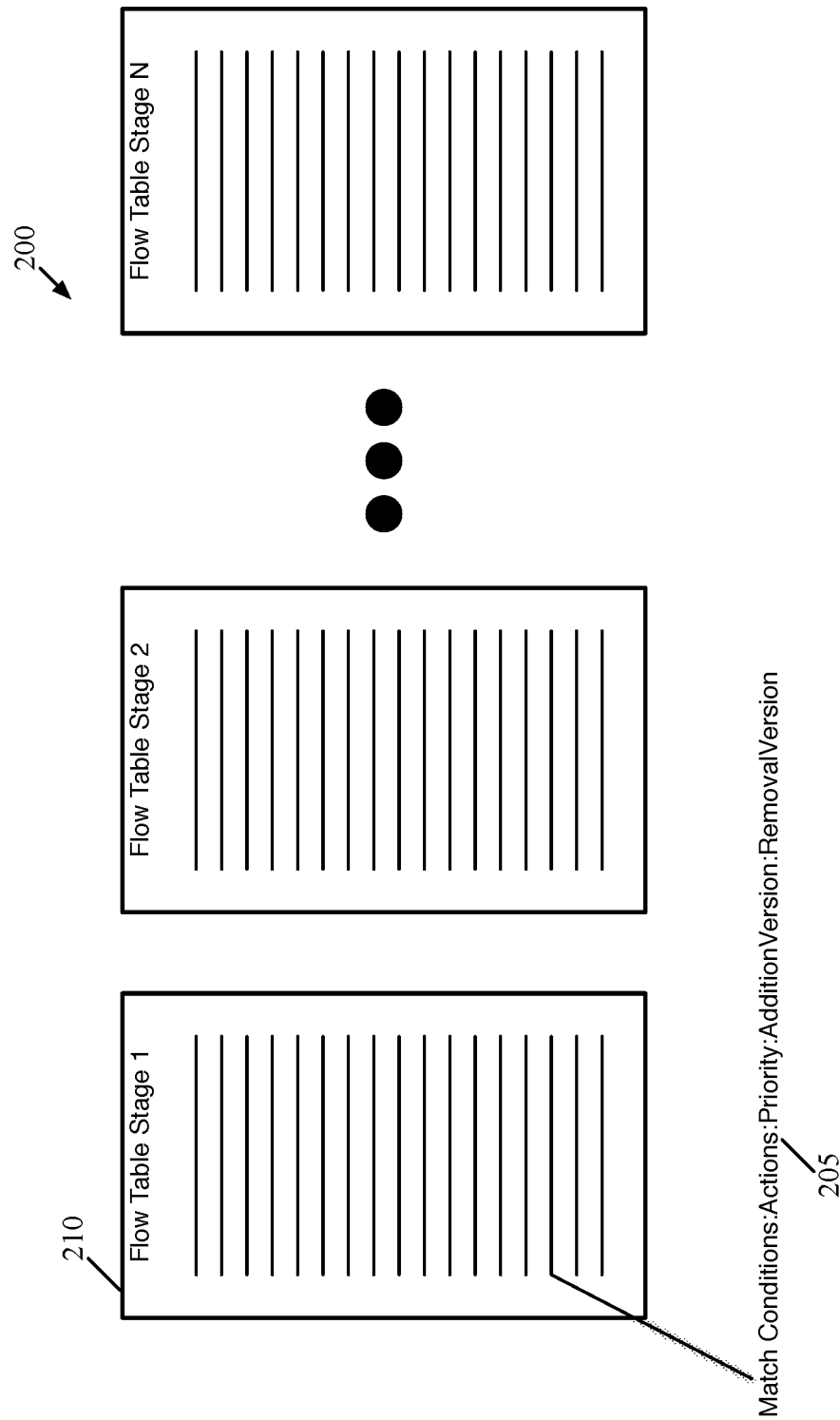
FIG. 2 illustrates an example of staged flow tables used by the flow-based MFE of some embodiments for multi-stage processing of packets.

FIG. 2 illustrates an example of staged flow tables 200 used by the MFE of some embodiments for multi-stage processing of packets (e.g., the flow tables 175). While, as mentioned above, the invention is applicable to both the flow entries of flow-based MFEs (such as OpenFlow-based forwarding elements) as well as rule-based MFEs (such as DPDK-based forwarding elements), many of the examples in this application describe the versioning of flow entries in a flow-based MFE. However, it should be understood that similar versioning can be applied to the rules stored in the configuration database of a rule-based MFE of some embodiments.

In some embodiments, the flow tables 200 represent one of numerous sets of flow tables through which packets may be processed. For example, a MFE might process packets for several different data compute nodes (e.g., VMs, containers, etc.) that attach to different logical networks, with different sets of flow tables for the different logical networks. In addition, the flow tables may not be arranged perfectly linearly, as the actions performed by the MFE according to a matched entry in a first table might cause the next lookup to be performed in one of several different tables depending on which particular entry is matched. However, the flow tables 200 are representative of the tables into which lookups are performed for a single packet after a cache miss (or multiple cache misses, in the case of a hierarchy of caches).

FIG. 2 also indicates the structure of a flow entry in the flow tables of some embodiments. As shown, the flow entry 205 in one of the tables 210 of some embodiments includes a set of match conditions, a set of actions, a priority (which may be optional) an addition version, and a removal version. The set of match conditions specifies a set of conditions that the packet must satisfy for the flow entry to be matched. These conditions may include values of packet header fields of the packet (e.g., source and/or destination network addresses, transport protocol and/or port numbers, etc.) as well as metadata and/or register values (i.e., values that specify the packet processing stage, logical network information, ingress or egress port values, etc.). The priority data is used when a packet could match more than one flow entry (e.g., if the set of match conditions are the same for more than one flow entry). When a packet matches multiple flow entries, the entry with a higher priority (which may be the higher or lower value, depending on how the MFE treats priority values) is treated as the matched entry. In some embodiments, the flow entries are designed to meet a requirement that no packet ever match more than one flow entry with the same priority (i.e., the MFE never has to choose between two equal-priority matching flow entries).

The set of actions specifies actions for the MFE to take with respect to a packet if the set of match conditions is met by the packet. These actions may include dropping the packet, outputting the packet to a particular port of the MFE, modifying a metadata or register value (e.g., updating a stage register, modifying logical switch or router information), modifying a packet header value (e.g., changing MAC addresses for a packet when routing the packet), resubmitting the packet for processing by the next stage, etc.

In some embodiments, each flow entry in the multi-stage flow tables 200 (or the rules stored in packet processing tables of a configuration database) also include a version range in which the flow entry is valid, specified by an addition version (the version in which the flow entry is first valid) and a removal version (the first version in which the flow entry is no longer valid). The MFE then stores a current version number, which is incremented with each bundle of modifications received from the controller (e.g., controller 180) and applied to the flow tables. When a packet is received by the user space packet processor (e.g., the MFE daemon 165) because the packet does not match any flow entries in the datapath cache(s), the MFE assigns the packet the current version number stored by the MFE. The MFE then only matches flow entries that are valid for that version number, precluding the packet from matching a flow entry that is either not yet valid for the packet (e.g., because processing on the packet had started before the flow entry was added to the table) or the validity of which has expired for the packet (e.g., because processing on the packet started after the flow entry was designated for removal, but the flow entry has not yet been removed because it could be valid for other packets the processing of which began earlier).

II. Versioning of Packet Processing Table Entries

As mentioned, the MFE of some embodiments implements a caching hierarchy, spanning from lockless (for lookups) packet processing tables (e.g., flow tables for a flow-based MFE), to a datapath megaflow (traffic aggregate) cache, and finally to a datapath exact match cache. This caching hierarchy is important for the reason that processing packets through complex pipelines of rules in the packet processing tables, often involving 15 or more matching operations, is prohibitively expensive for a software forwarding element. Using the caching hierarchy, only a small subset of packets is subjected to the full packet processing pipeline traversal. Nevertheless, there are many typical cases where the cached rules need to be re-validated to make sure they still represent the rules in the packet processing tables and the switch configuration in general. One such case appears when rules in the tables are changed (that is, rules are deleted, modified or added). The purpose of modifying the packet processing tables is to make a change in how the MFE processes packets, so even with an otherwise effective caching hierarchy, the performance of the multi-stage packet processing pipeline is still important.

One possible solution to this problem of datapath atomicity is to implement two sets of packet processing tables, which are identical to each other in a steady state. Then, when a flow entry is deleted, modified, or added, the change is made into one of the tables considered as a "staging area". Meanwhile, all datapath lookups are performed on the other table considered "stable". Once the changes are completed, the roles of the tables are reversed in an atomic fashion.

However, this approach has several problems. First, having two separate sets of tables forces additional synchronization between the packet processing (the datapath threads) and the table updating mechanism (the control threads). For example, after swapping the roles of the tables, the table updating mechanism must wait until the MFE has finished processing all packets with the (now) "staging table" before issuing any new modifications. This will add to the control plane latency and make inserting new rules slower. One obvious solution to this issue is to use more than two tables, but that compounds the other problems described below.

Second, any datapath thread may itself call in to the control plane to request a packet processing table change. Examples of this include the 'learn' action (which generates a new rule) and MAC learning. Because of this, a situation could occur in which a datapath thread is waiting for write access to one of the sets of packet processing tables, but doing so keeps the other table in use for longer than would otherwise occur, causing a deadlock. As an example, if two datapath threads are executing table lookups on the different tables (because the later lookup started after the roles of the tables were changed by the control thread), and the datapath thread operating on the older version needs to execute a learn action, it would need to wait for the current staging table to become unused by any thread. The changes can not be performed on the table the other thread is using, so the datapath thread is essentially waiting for itself to finish, which is a deadlock.

Third, storing multiple copies of the entire set of packet processing tables with all of their rules both wastes memory and causes memory caching inefficiencies when switching tables. Essentially, all CPU memory caching the packet processing table entries becomes invalid when switching from one table to another. Given that CPU cache misses are a significant limit in the classification performance of packet processing tables, using multiple times the memory and forcing CPU memory cache invalidation exacerbates the problem.

Given this, an optimal solution should allow for multiple versions of rules to exist in parallel (e.g., in the same set of packet processing tables). The minimum number of available versions should be twice the maximum number of datapath threads (i.e., twice the number of packets that could be processed at once) plus one. This allows for the possibility of a separate version for each datapath thread and for staging due to 'learn' actions or the equivalent by datapath threads, as well as a version for staging by the control threads. In practice, some versions might be skipped if no lookups were necessary for a particular version, so larger numbers of versions may be beneficial to help avoid explicit synchronization between the control threads and datapath threads. In addition, such an optimal solution should minimize the use of additional memory due to versioning in order to keep the CPU memory cache performance (hit rate) as good as possible.

The solution of some embodiments maintains a version number that increments each time modifications are made to the set of packet processing tables used to process packets in the MFE. When the MFE begins processing a particular packet, the MFE assigns the current version to the packet, which is maintained throughout the processing of that packet even if the current version for the MFE changes during processing (due to the table being modified). Each entry in the packet processing tables includes a range of versions for which the rule is valid, and the MFE only allows the packet to match rules that include the version number assigned to the packet within their valid range.

Some embodiments define the validity range by appending to each rule a first version number (the addition version) indicating when that rule was added to the packet processing table and a second version number indicating when the entry is to be removed from the packet processing table (the removal version). When a rule is initially added, the addition version for that rule is the current version number plus one, and the removal version is the maximum version number (some embodiments use a large enough version number (e.g., 64 bits) such that it can be assumed that the maximum version number will not be reached). To remove a flow entry, the MFE modifies the removal version for the entry to be the current version number plus one. In some embodiments, once all packets having a particular version number are fully processed by the MFE, the MFE purges the flow entries with that particular version number as their removal version.

To modify an existing rule, the MFE removes the entry for the existing rule (by modifying its removal version) and adds the new, modified rule as a separate entry having the same match conditions and priority. Because the range of the two entries is non-overlapping, only one of the entries will be valid for any given packet, so the MFE will never have to choose between two matching, equal priority rules.

Figure 3:
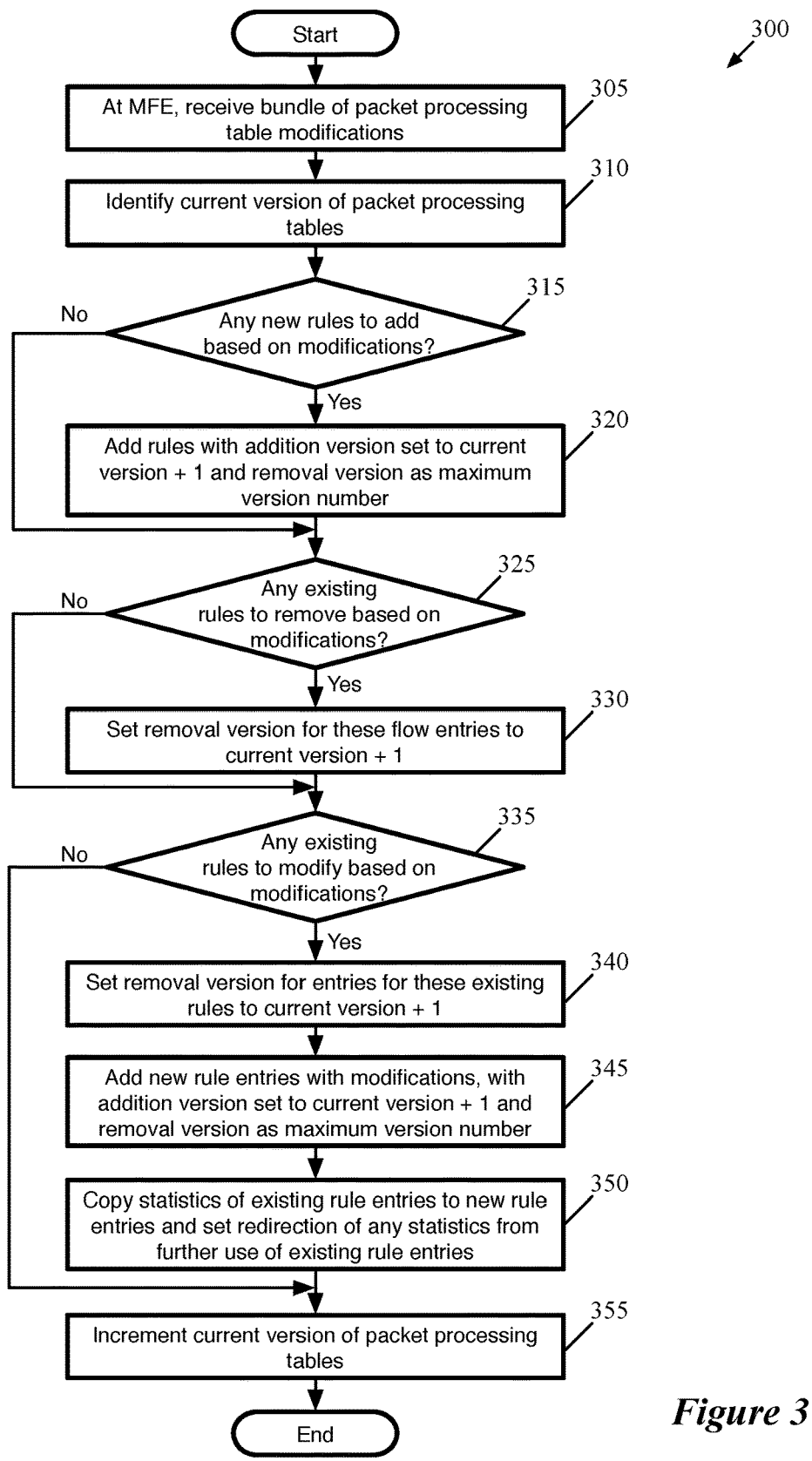
FIG. 3 conceptually illustrates a process performed by the MFE of some embodiments to receive an update to its packet processing tables and implement the changes.

FIG. 3 conceptually illustrates a process 300 performed by the MFE of some embodiments to receive an update to its packet processing tables (e.g., from a network controller, based on a learn action, etc.) and implement the changes. The process 300 enables the MFE to guarantee consistency when processing packets (e.g., according to the process 700 of FIG. 7, described below). The process 300 will be described by reference to FIGS. 4-6, which illustrate examples of flow table modifications made based on updates received by a flow-based MFE 400 from a network controller 405.

As shown, the process 300 begins by receiving (at 305) a bundle of packet processing table modifications at the MFE. In some embodiments, these modifications may be received from a network controller (e.g., through the OpenFlow protocol or other forwarding element configuration protocol). The network controller, in different embodiments, may be a local controller operating on the same physical machine as the MFE or a centralized network controller that operates on a separate physical machine and manages numerous MFEs in a network. In some embodiments, when receiving updates from a network controller, the updates are received as a bundle using, e.g., a fixed point identifier to indicate when the bundle is complete. This allows the controller to ensure that the MFE will not install updates to the packet processing table rules until all of the updates have been sent to the MFE, so that the MFE will not process packets with partial update information (i.e., solving a similar problem to the versioning described herein). The packet processing table modifications could also be received from learn actions or similar packet processing actions within the MFE.

The process then identifies (at 310) the current version of the packet processing tables of the MFE. As mentioned, in some embodiments the MFE maintains a current version number for the packet processing tables, which is incremented with each set of changes applied to the tables. The update process uses this current version in order to apply the appropriate addition and removal version numbers to rules being modified, as will be described below.

The process 300 then determines (at 315) whether any new rules are to be added based on the modifications. New rule entries might need to be added if, for example, a VM is added to a logical network, such that packets should no longer be sent to that VM, if routes have been learned by a controller for a particular logical router, if new ACL rules are added, etc. If a VM is added to a host machine on which the MFE operates, then numerous rules (e.g., entire stages of packet processing tables) will need to be added in order to accommodate that VM and its logical network.

In some embodiments, rules may be added, removed, or modified within the packet processing tables. While the process 300 is shown as a linear process that adds, then removes, and then modifies table entries, it should be understood that this is a conceptual process, and some embodiments may perform these operations in a different order, in parallel, or interspersed according to the manner in which the modifications are received from the controller (e.g., if the controller sends the removals and/or modifications before the additions).

When rules need to be added to the packet processing tables, the process 300 adds (at 320) the necessary rule entries with their addition version number set to the current version (identified at 310)+1 and the removal version as the maximum version number. By setting the addition version number to the current version+1, the entry will not be valid for packets currently undergoing packet processing. This ensures that a packet will not be processed by a first rule at a first stage, then processed by a second, newer rule at a second stage that should not be valid at the same time as the first rule (e.g., because the first rule is to be removed in the same set of updates that the second rule is added). The maximum version number, in some embodiments, is designed to be large enough that it should never be reached during the operation of a MFE. For instance, some embodiments use 64-bit version numbers, as it can be assumed that $1.8 \times 10^{19}$ will not be reached, so long as the current version is incremented by 1 with each set of modifications. Other embodiments may use a smaller maximum version number (e.g., 32-bit version numbers) and use additional logic to handle wrapping back to zero when the maximum is reached.

Figure 4:
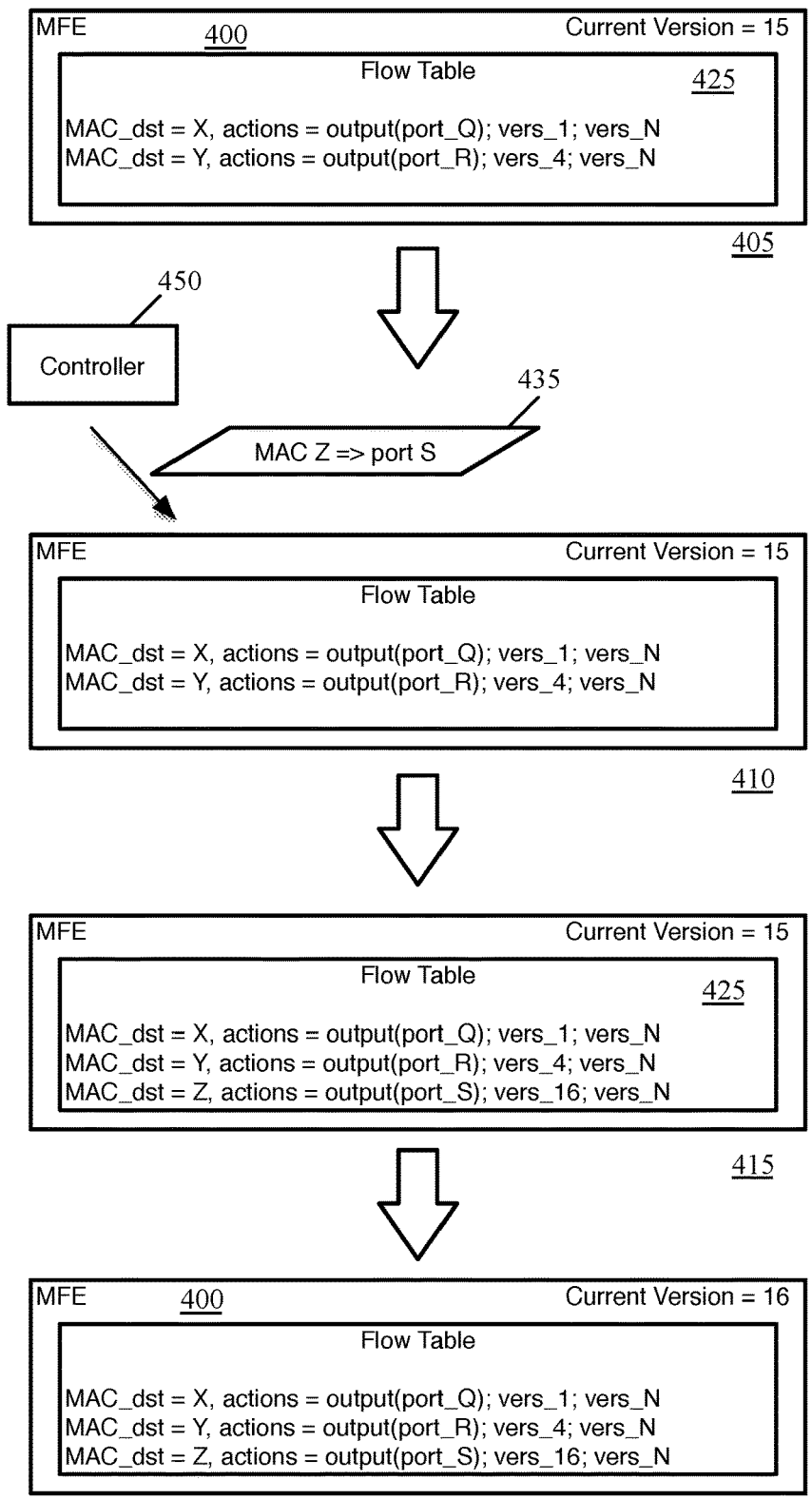
FIG. 4 conceptually illustrates a flow-based MFE that receives, from a controller, an update specifying to add a flow entry.

FIG. 4 conceptually illustrates a flow-based MFE 400 that receives, from a controller 450, an update specifying to add a flow entry over four stages 405-420. For simplicity, the figure illustrates a portion of a single flow table 425 of the MFE 400, though one of ordinary skill would recognize that the MFE of some embodiments would have additional flow tables for different stages of the packet processing. As shown, at the first stage 405 the current version of the flow tables of the MFE is 15, and the flow table 425 includes two flow entries, both of which match over the destination MAC address of the packet. It should be understood that these are highly simplified examples of flow entries, many of which would match over various additional fields (e.g., stage registers, logical switch or router identifiers, etc.). In this example, the first flow entry is matched by packets with a destination MAC address of X, and the action specifies to output such packet to port Q of the MFE. The second flow entry is matched by packets with a destination MAC address of Y, and the action specifies to output such packets to port R of the MFE. Both of the flow entries are currently valid, with the first entry added in version 1 and to be removed in version N (N being used to represent the maximum version number) and the second entry added in version 4 and to be removed in version N).

In the second stage 410, the controller 450 (which may be a local controller operating on the same physical machine as the MFE 400 or a centralized controller that provides updates to numerous MFEs including the MFE 400) provides an update 435 to the MFE 400. As shown, this update specifies that packets with destination MAC address Z should be sent to port S. In different embodiments, the update may be sent as a flow entry (e.g., via the OpenFlow protocol), as a data tuple that can be converted into a flow entry, etc. In addition, it should be understood that a typical update bundle will include more than a single flow entry addition, removal, or modification. As an example, an update might be the result of a new remote VM being added to a logical network, which would require adding flow entries for logically forwarding packets to a logical egress port associated with the address of the VM, flow entries for tunneling packets to the physical destination, possibly updating ACL entries, etc. However, for the sake of simplicity, these examples illustrate single changes being made to a single flow table.

Thus, in the third stage 415, the flow table 425 has been updated to include a third flow entry for the new destination MAC address Z, specifying to output packets with this destination address to port S of the MFE 400. Because the current version number for the flow table 420 is 15, the MFE adds this flow entry with an addition version of 16 and a removal version of N (the maximum version number). Using the version number 16 ensures that (i) packets that have already started processing will not be able to match this flow entry (while not important in this case, this could be important if other flow entries are affected), and (ii) the flow entry will become valid once any other updates in its bundle are also applied and the updates committed by incrementing the version number. As shown, in the fourth stage 420, the MFE commits this flow entry by incrementing its current version number to 16.

Returning to FIG. 3, the process 300 then determines (at 325) whether any existing rules are to be removed based on the modifications. Rules might need to be removed if, for example, a VM is removed from a logical network, such that packets should no longer be sent to that VM. On a larger scale, if a VM that connects directly to a MFE (e.g., is hosted on the same machine as the MFE) is removed or migrated to a different host machine, then all of the rules pertaining to that VM and its logical network will need to be removed (unless other VMs on the same logical network remain connected to the MFE, in which case only certain rules will need to be removed).

When rules need to be removed from the packet processing tables, the process 300 sets (at 320) the removal version for these rule entries to be the current version (identified at 310)+1. In some embodiments, these rules would previously have removal versions equal to the maximum possible version number. By setting the removal version for the rule to the current version+1, the rule remains valid for current packets received prior to the commitment of the rule update, but ensures that once the update is committed (and the current version of the packet processing table incremented), these rules will no longer be valid for new packets. As described in greater detail below, the removed entries remain in the table for a period of time, until the MFE has completed processing all packets for which the flow entry is valid.

Figure 5:
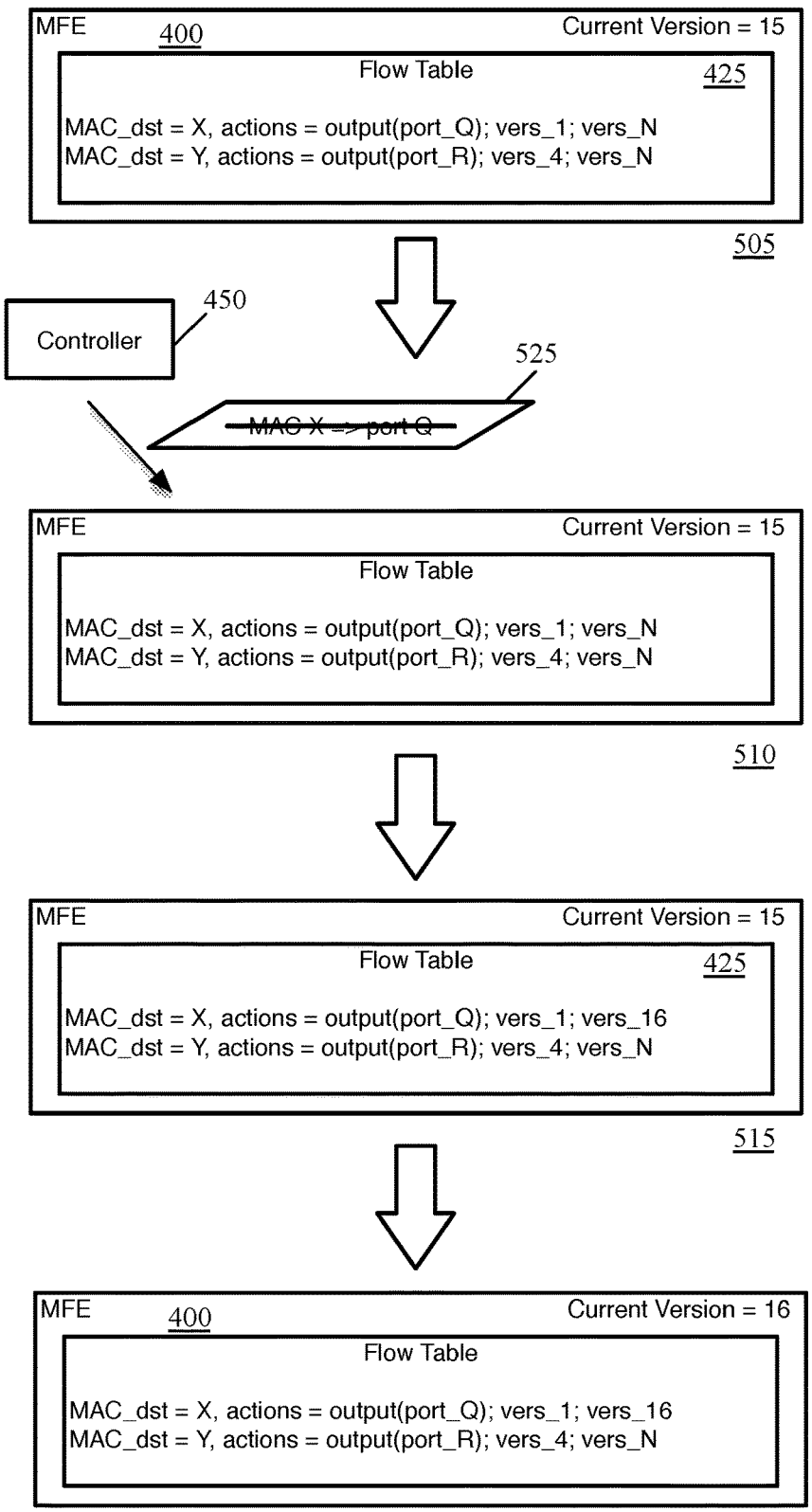
FIG. 5 conceptually illustrates a flow-based MFE that receives, from a controller, an update specifying to remove a flow entry.

FIG. 5 conceptually illustrates the flow-based MFE 400 receiving, from the controller 450, an update specifying to remove a flow entry over four stages 505-520. At the first stage 505, the current version of the flow tables of the MFE is again 15, and the flow table 425 includes the same two flow entries as in the first stage 405 of FIG. 4. In the second stage 510, the controller 450 provides an update 525 to the MFE 400, which specifies for the MFE to no longer send packets with destination MAC address X to port Q. In some embodiments, the controller explicitly specifies that this update involves removal of a flow entry.

Thus, in the third stage 515, the MFE has updated the flow table 425 such that the first flow entry, matched by packets with destination address X, has a removal version number of 16 rather than the maximum version number N. Using the version number 16 for removal (rather than 15) ensures that (i) packets that have already started processing will be able to match this flow entry, and (ii) once the update is committed by incrementing the version number, the flow entry will no longer be valid for new packets received at the MFE. As shown, in the fourth stage 520, the MFE commits this update by incrementing the current version number to 16.

The entries for removed rules are not actually removed from the table until it can be certain that no datapath threads (currently processed packets) are using lookup version numbers for which the flow entry is still valid (i.e., within the flow entry's valid range). Some embodiments perform a search at regular time intervals or after the last packet with each lookup version number is completed to identify rule entries that can be removed. However, this is not the most efficient manner of purging old flows from the tables.

Other embodiments use synchronization between the datapath threads processing the packets and the control threads updating the table. Specifically, some such embodiments use read-copy-update (RCU) for this synchronization by using a RCU-postponed function call to remove the old rules from the packet processing tables, which does not impose a performance penalty on the datapath threads. This RCU synchronization mechanism (as well as other possible synchronization mechanisms) ensures that the call to remove the old rule from the packet processing table cannot be executed until all of the datapath threads that could use the flow entry have been completed.

Returning again to FIG. 3, the process 300 determines (at 330) whether any existing rules are to be modified based on the received modifications. In some embodiments, a modification of a rule (as opposed to a removal and/or addition of a rule) occurs when the actions are changed for a rule, but the match conditions and priority remain the same. In other embodiments, the update specifies between additions/removals and modifications, and is able to denote a rule modification even if the match conditions or priority change. Rules could be modified if, for example, a remote VM is migrated, such that packets addressed to that VM are sent to a different output port or through a different tunnel.

When rules need to be modified within the packet processing tables, the MFE of some embodiments treats this as a removal of the existing rule entry and an addition of a new rule entry, but with a carryover of the statistics from the old entry to the new entry. Thus, the process 300 sets (at 340) the removal version for these rule entries to be the current version+1. The process also adds (at 345) new rule entries with the modifications (e.g., updated actions, etc.) with their addition version number set to the current version+1 and the removal version number as the maximum version number. This ensures that (i) packets already being processed will only match the old entry for the rule, while (ii) new packets received after the updates are committed will only match the new entry for the rule, in order to guarantee consistency in packet processing.

In addition, the process copies (at 350) the statistics of the existing rule entries that are being modified to the new rule entries and sets for redirection of any updates to these statistics from any further matching of the existing rule entries, so that the updates will be applied to the corresponding new rule entries. In some embodiments, statistics allow the MFE to keep track of various non-static data regarding the rule, such as the number of packets and/or bytes that have matched the rule, the length of time for which the rule has been active, the length of time since the rule was last matched, etc.

Because the existing (old) entry for the rule could still be matched by packets already being processed, any statistics updates resulting from such matches are redirected to the new entry for the rule (e.g., by setting a flag on the existing entry) so that these stats are not lost. This ensures that statistics will not be lost just because a rule was modified slightly. In some embodiments, the MFE maintains references from each cached rule (e.g., exact match and traffic aggregate cache entries) to the numerous rule entries that were matched in order to generate those cache entries, for statistics attribution purposes (i.e., when a cache entry is matched, this affects the statistics of all of the multi-stage packet processing table entries that it represents). Thus, the statistics from these existing cache entries that may be matched after the copying of the statistics from the old rule entry to the new rule entry are not lost, because they are attributed to the old entry and then redirected to the new entry. However, some embodiments allow for the update to explicitly skip the copying and redirection operations in order to reset the statistics for the new entry.

In addition, the combined removal/addition in order to enact a modification must ensure that the new rule cannot be removed from the packet processing tables in memory before the old rule under any circumstance (because the new rule has the most updated statistics). Some embodiments guarantee this condition by taking an explicit reference to the new entry for the rule, held with a non-NULL pointer within the old, replaced rule entry. When the old entry is finally removed (after all packets for which the old entry is still valid have completed processing), this reference is freed and the new entry can be removed (if necessary according to subsequent updates).

Figure 6:
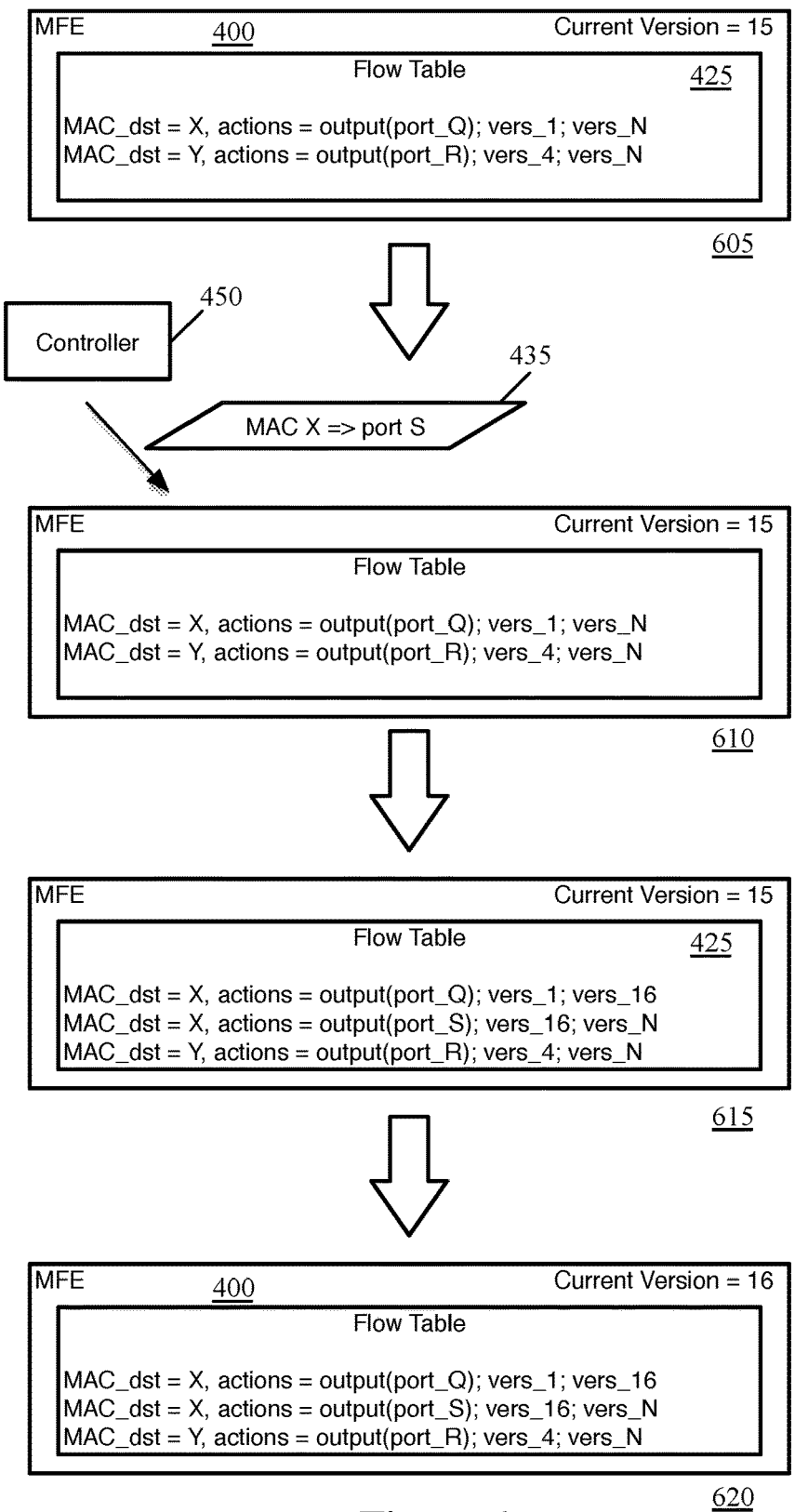
FIG. 6 conceptually illustrates a flow-based MFE that receives, from a controller, an update specifying to modify a flow entry.

FIG. 6 conceptually illustrates the flow-based MFE 400 receiving, from the controller 450, an update specifying to modify a flow entry over four stages 605-620. At the first stage 605, the current version of the flow tables of the MFE is again 15, and the flow table 425 includes the same two flow entries as in the first stage 405 of FIG. 4. In the second stage 610, the controller 450 provides an update 625 to the MFE 400, which specifies for the MFE to send packets with a destination MAC address X to port S (rather than port Q). In some embodiments, the controller explicitly specifies that this update involves modifying an existing flow entry.

Thus, in the third stage 615, the MFE has updated the flow table 425 such that the first flow entry matched by packets with a destination address X has a removal version number of 16 rather than the maximum version number N. In addition, the MFE has added a third flow entry to the flow table 425 with the same match condition (destination MAC address=X) but a different action (outputting such packets to port S rather than port Q). Without the version numbers, this would not be a permissible scenario, as packets having destination MAC address X would match multiple equal priority flow entries in the flow table. However, this new flow entry has an addition version number of 16 and a removal version number of N (the maximum version number). As such, its range of validity is mutually exclusive with that of the old flow entry, and no packet can validly match both flow entries. Packets for which processing has already begun will match the first flow entry, while new packets for which processing begins after the update is committed will match the new flow entry. In addition, though not shown, all of the old statistics for the first flow entry are copied to the new flow entry at this stage. At the fourth stage 620, the MFE commits this update by incrementing the current version number to 16.

Lastly, returning to FIG. 3, the process 300 increments (at 355) the current version of the packet processing tables, which commits the updates made to the packet processing tables (and makes these updates valid for new packets that the MFE subsequently processes.

It should be noted that bundling of update, in some embodiments, not only is used for datapath atomicity, but transactionality in general. As such, the mechanisms described above for ensuring datapath atomicity should also support undoing failed transactions that involve multiple packet processing table modifications (additions, removals, deletions) within each atomic transaction (e.g., each update bundle). As shown above, adding, deleting, or modifying multiple distinct rules is accomplished by using the same future version number (the current version+1) for all modifications within a single update bundle.

When one of the rule updates cannot be enacted (because a rule cannot be added or removed), the already-performed (but not yet committed) add, delete, and modify operations can be undone by (i) removing the added flow entries that are not yet visible to lookups and (ii) restoring the removal version number to the maximum number for each of the flow entries that were marked for deletion. For modifications to a rule, both of these operations are performed.

In addition, at a general level, modifications within an update bundle may target the same rule more than once. Some embodiments handle this additional complexity by (i) not considering a rule entry for further modification once it has been marked for deletion by changing its removal version number (such rules, though still valid for datapath lookups, are no longer visible for control manipulations) and (ii) making any added rule entries that are not yet valid for datapath lookups visible for further control manipulations, such as deletes or replacements. As a result, the classifier may end up with more than two copies of rule entries with the same matching criteria and priority. At most one of these entries will not be marked for deletion, however, and this will always be the latest of the duplicate entries added to the packet processing table (intermediate rule entries may have the same version number for their addition and removal version numbers).

When one of the operations in the bundle fails, some embodiments undo the addition, removal, and modification operations in the reverse order in which they were performed, essentially reversing the packet processing table transformations (one at a time) until the previous unmodified state is reached. Because of the versioning, none of these changes will ever have been visible to the packet processing lookups, and a bundle commit failure can be returned to the controller.

Furthermore, some embodiments perform iteration of the packet processing tables in a specific version. The iteration may also be performed in a special version number (e.g., one less than the maximum possible version number) that means iterating in the latest version number, where all rule entry additions and removals have taken place. As the table iteration is not performed by the datapath threads, it is not required to be datapath atomic in some embodiments. That is, when replacing a rule, some embodiments mark the existing rule for deletion in a future version, then add a new rule to be visible in the same version. If the control thread iterated the rules between these operations, there would appear to be a version in which the rule was missing. Thus, some embodiments prevent the external controller from facing this state by taking an explicit control-plane lock before any packet processing table operation and releasing this lock only after the operation is completed.

Figure 7:
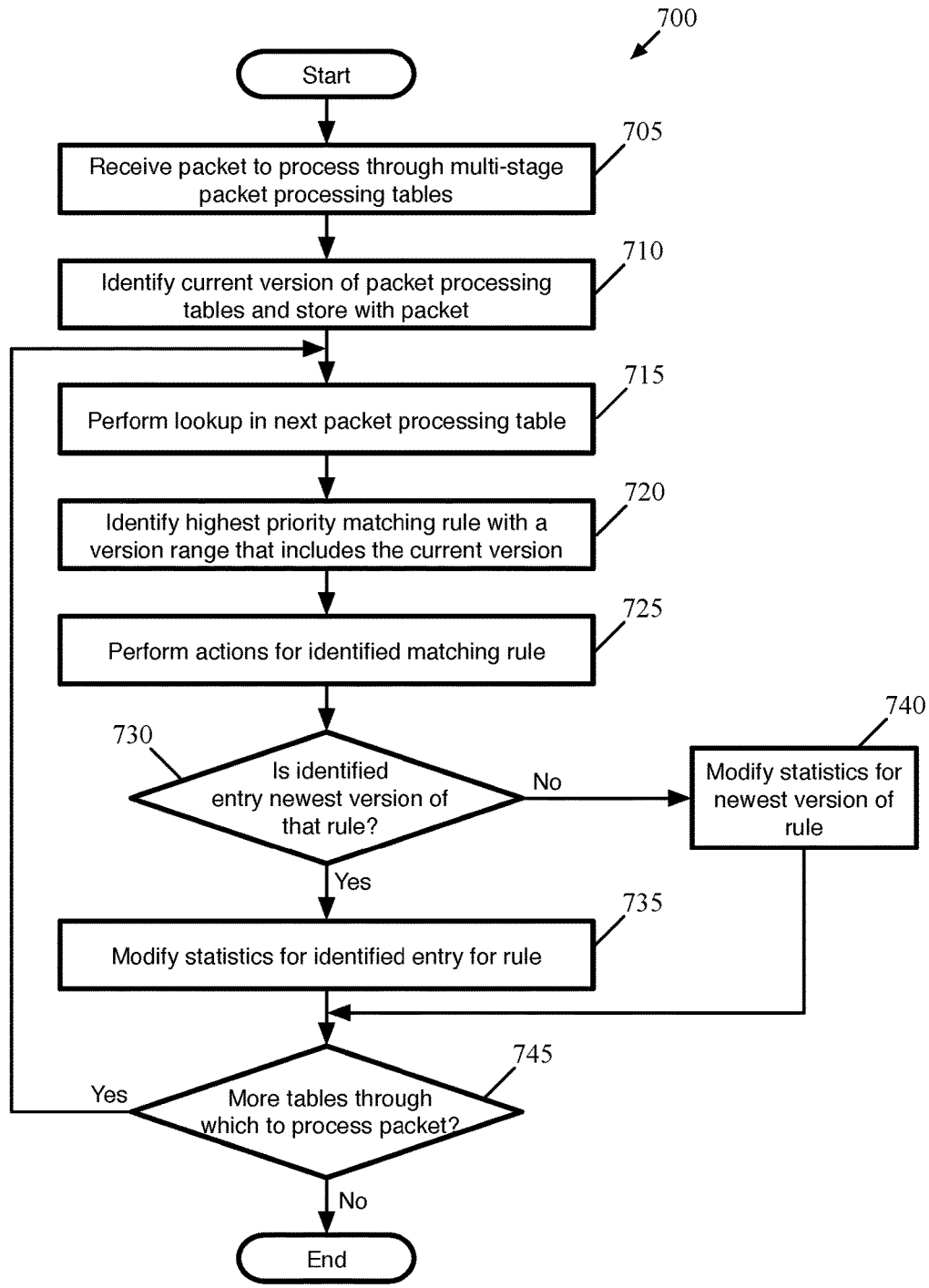
FIG. 7 conceptually illustrates a process performed by the MFE to process a packet through the multi-stage packet processing tables using a current version number for the packet.

The above discussion relates to the updating of packet processing tables according to some embodiments of the invention. FIG. 7 conceptually illustrates a process 700 performed by the MFE to process a packet through the multi-stage packet processing tables using a current version number for the packet. In some embodiments, the MFE performs the process 700 for packets for which a matching cached entry cannot be found. As the caches only involve a packet matching a single rule (as opposed to multiple rules over multiple stages), atomicity is not a concern for these caches. In addition, the caches are kept up to date in a standard manner, with the removal of cached entries generated (e.g., based on removed rule from the multi-stage process in some embodiments).

As shown, the process 700 begins by receiving (at 705) a packet to process through the multi-stage packet processing tables (i.e., a packet that resulted in a cache miss). The packet might be the first packet in a data flow, or the first packet since an update resulted in the removal of a cached rule that would otherwise have been matched by the packet.

The process then identifies (at 710) a current version of the packet processing tables and stores this version number with the packet. This version number is the version of the packet processing tables that will be used to process the packet, even if the current version number is incremented while the packet is being processed through the stages of lookup tables. Some embodiments may store the version number in a specific register or metadata field of the packet, while other embodiments use other techniques to track the version number of the various packets being processed by the MFE.

The datapath threads, in some embodiments, fetch the current packet processing table version number using an atomic operation, so that the version number is always coherent (and not, for example, a mixture of old and new version numbers by fetching some bits from the new version and some from the old version). To allow for easier access to the version number in the control threads, some embodiments use a non-atomic current version number, protected by an explicit lock, that is accessed by the control threads for computing the next future version number to use in the packet processing table modifications described above (e.g., the current version number+1). When packet processing table modifications are completed, the control thread publishes the next future version number (i.e., the new current version number) for datapath thread consumption using an atomic memory operation.

The packet then begins the multi-stage processing. As shown, the process performs (at 715) a lookup in the next packet processing table. In some embodiments, the tables are not arranged in a hard-wired order (e.g., when the MFE is a software MFE), but there is an initial packet processing table used for incoming packets (e.g., a table that matches over the physical ingress port of the packet, in order to assign the packet to a logical forwarding element and that logical forwarding element's set of packet processing tables), or an explicit mapping of physical ingress ports to initial packet processing tables.

The process then identifies (at 720) a highest priority matching rule with a version range that includes the current version assigned to the packet. In some embodiments, the version range for a rule starts with the addition version number of the entry and ends with the removal version number−1. Some embodiments perform the lookup by first identifying a matching rule in the current table, then determining whether this rule is valid for the packet given the packet's version number. If an invalid match is found, some embodiments perform a second lookup without this invalid rule to determine whether a lower priority matching rule is available. If two matches with equal priority are found, at most one of these matching entries will be valid for the packet, as the two entries are not allowed to have overlapping version ranges.

With a matching rule found, the process performs (at 725) the actions specified by the matching entry on the packet (if no valid matching rule is found, some embodiments perform a default action, such as dropping the packet). These actions could include modifying metadata or register values, modifying packet header values, selecting a port for output, dropping the packet, resubmitting the packet, etc.

The process 700 then determines (at 730) whether the identified rule is the newest version of the rule, in order to determine to which entry for the rule any statistics updates should be applied. In some embodiments, rather than search to determine whether additional matching flow entries with newer version numbers are available, the process determines whether the matched and executed entry for the rule has a redirection attached to it that specifies to redirect statistics updates to a different flow entry. When no such redirection is applied (the identified entry is the newest version), the process modifies (at 735) the statistics for the identified entry (updating the packet and byte count, etc.). On the other hand, when a different entry is the newest version of the rule, the process modifies (at 740) the statistics for the newest version of the rule, ignoring the statistics for the identified entry (which will be deleted from the packet processing tables soon).

The process determines (at 745) whether the packet is to be processed through additional tables, and ends when no more processing is required. Otherwise, the process 700 returns to 715 to perform a lookup in the next packet processing table for the packet (which may, e.g., be specified by the actions of the previous rule or by a set of register values for the packet). In some embodiments, processing is completed if no resubmit action is included in the previously identified flow entry. For instance, if a packet is output to a particular port of the MFE, dropped, etc., then no additional table lookups may be necessary.

Though not shown, in some embodiments the MFE also generates cache entries such that subsequent similar packets will not require processing through the multi-stage packet processing tables. Some embodiments generate both an exact-match entry (matching on the entire packet header and non-intermediate metadata and/or register fields) and a traffic aggregate entry (matching on the specific packet header and non-intermediate metadata and/or register fields used for matching during the multi-stage processing).

Figure 8:
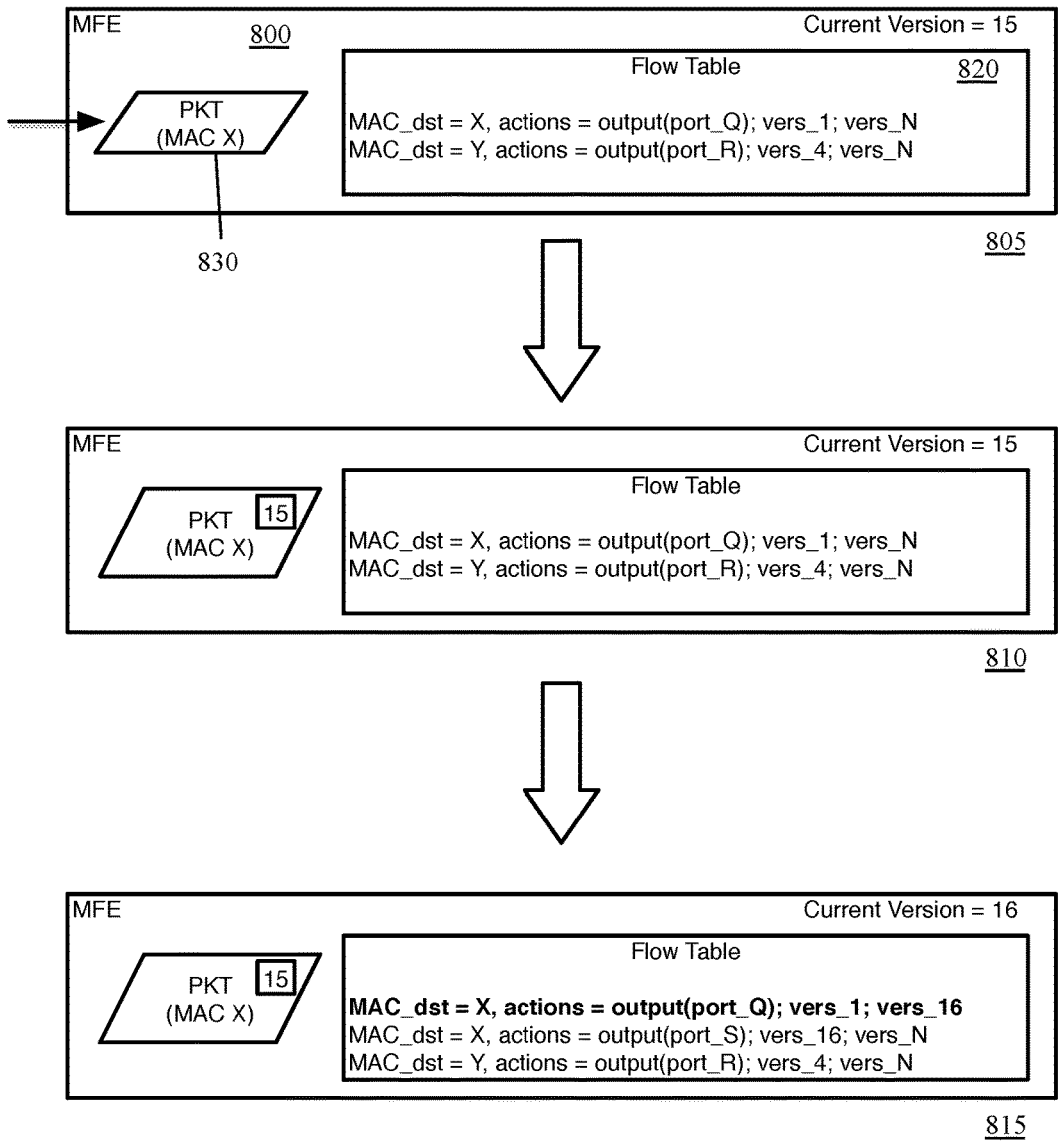
FIGS. 8 and 9 conceptually illustrate examples of packet processing through a specific flow table of a flow-based MFE of some embodiments.
Figure 9:
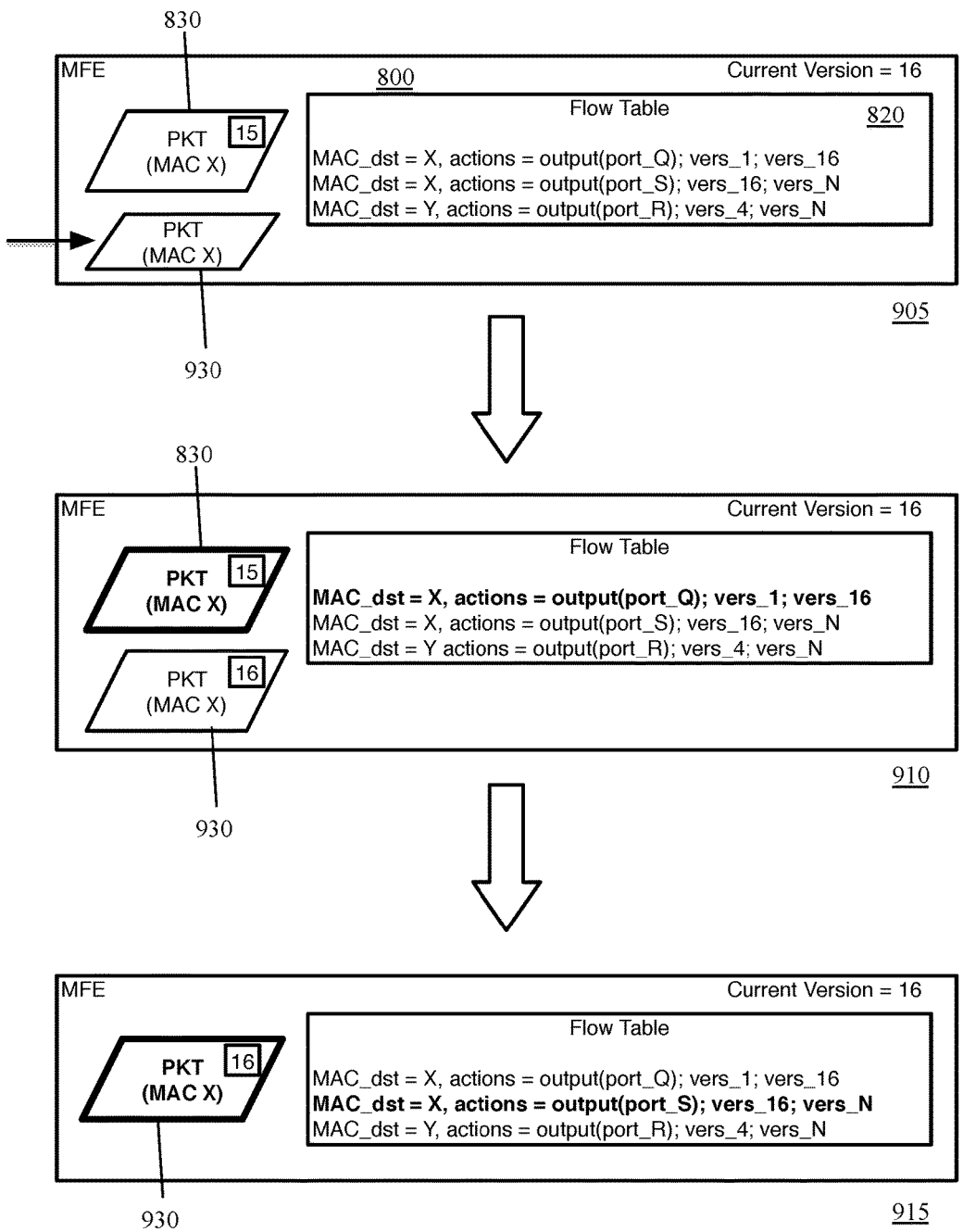

FIGS. 8 and 9 conceptually illustrate examples of packet processing through a specific flow table 820 of a flow-based MFE 800. Specifically, FIG. 8 illustrates the processing of a first packet over three stages 805-815. The MFE 800 includes multiple flow tables for different stages of processing in some embodiments, but only one of these (the flow table 820) is illustrated here for simplicity. As with the MFE 400, this flow table 820 matches over the destination MAC address.

The first stage 805 illustrates that the flow table 825 includes two flow entries: a first flow entry that matches on address X and outputs such packets to port Q and a second flow entry that matches on address Y and outputs such packets to port R. The current version number for the set of flow tables is 15, and both of these flow entries are currently valid (both of them have the maximum version number for their removal version). In addition, at this stage, the multi-stage packet processing module of the MFE (e.g., the MFE user space daemon) receives a packet 830 with a destination MAC address of X.

In the second stage 810, the MFE has assigned the version number 15 to the packet 830, as this is the current version of the MFE flow tables. The MFE has not yet performed a lookup in the flow table 820 (and there is no guarantee that it will do so, as the packet could be dropped, output according to a flow entry in a different table, etc.). The MFE might be performing lookups for the packet 830 in other tables during this stage.

At the third stage 815, the MFE has modified the first flow entry, such that two flow entries in the flow table 820 match on the destination MAC address X. The first flow entry is valid from version 1 to version 15 (its removal version is 16), while the second flow entry is valid from version 16 to the maximum version. In addition, the flow entry has been committed, by updating the current version of the MFE's flow tables to 16. However, the packet 830 is still assigned a version number of 15, and therefore when the MFE performs a lookup in the flow table 820, the packet matches against the first flow entry that is still valid for its version number 15 (shown by the bolding of this flow entry in the figure).

FIG. 9 illustrates the processing of two packets that are assigned different version numbers through the flow table 820 of the flow-based MFE 800 over three stages 905-915. In the first stage 905, the flow table 820 has already had the changes shown in FIG. 8 applied and committed, such that the current version number is 16, the packet 830 is assigned the version number 15, and the packet has not yet been matched against the flow table 820. In addition, a new packet 930 is received at this first stage 905. This packet also has a destination MAC address of X, the same as the first packet 830.

In the second stage 910, the first packet 830 is processed against the flow table 820, and (as in stage 815 of FIG. 8) matches the first flow entry valid from version 1 to version 15 (because its assigned version number is 15). In addition, at this stage, the second packet 930 has been assigned the current version number 16, as this is the current version of the MFE flow tables.

In the third stage 915, the first packet has been output, and the MFE performs a lookup in the flow table 820 for the second packet. Because this packet has a version number of 16, it matches the second flow entry that specifies to output the packet to port S, rather than port Q. In addition, if the packet 830 was the last packet in the MFE with a version number of 15 or lower, the MFE will remove the first flow entry from the table, as it will never be valid for any future packet.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
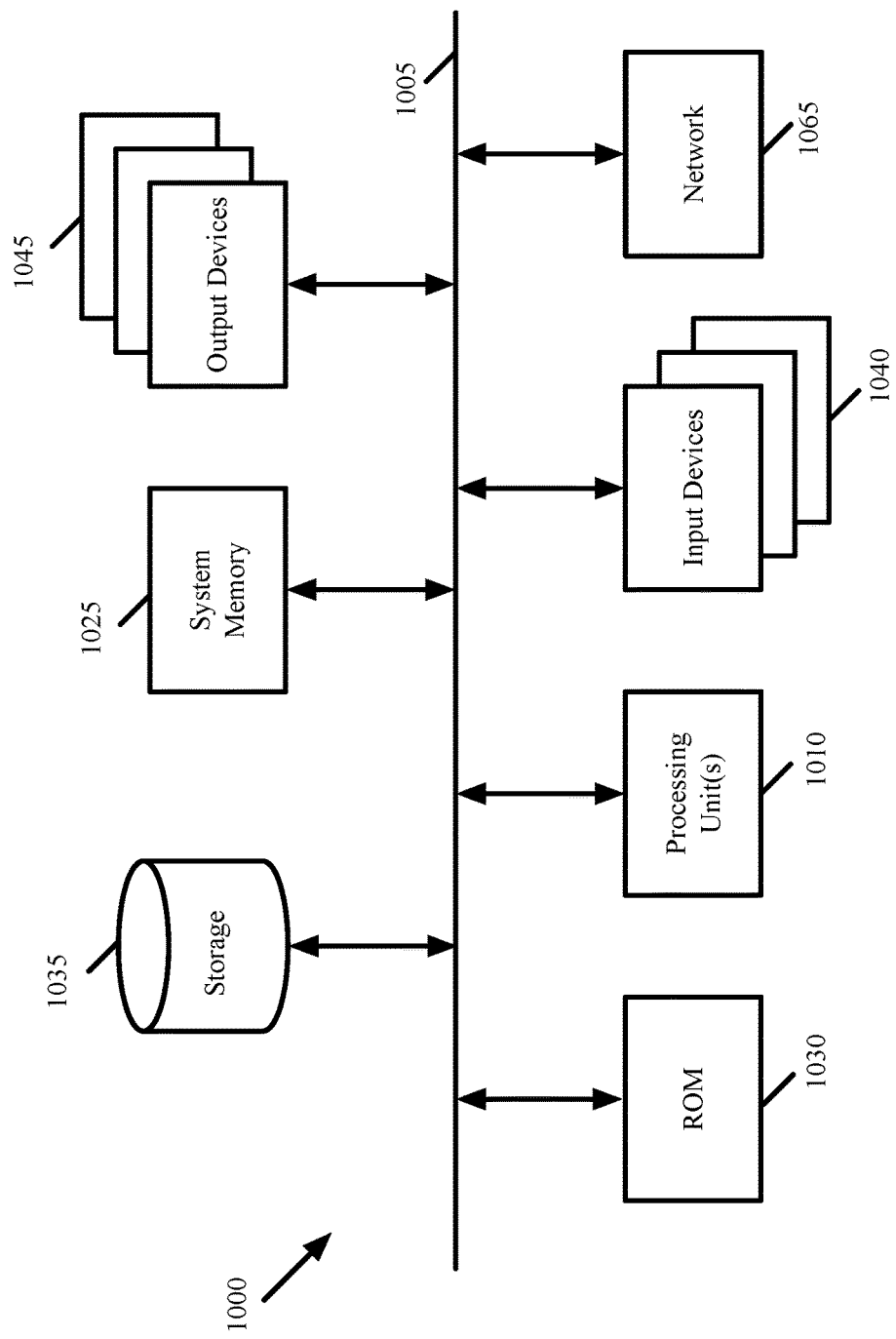
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3 and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. For a managed forwarding element that processes packets through a set of packet processing tables by matching rules in the packet processing tables, a method comprising:
   receiving an update that requires modification to at least one of the packet processing tables, wherein each rule in the packet processing tables is assigned a range of packet processing table versions in which the rule is valid to be used for processing packets;
   modifying the packet processing tables according to the received update by at least one of (i) ensuring an existing rule is removed by modifying the range of packet processing table versions in which the existing rule is valid such that a current packet processing table version is the last packet processing table version in which the existing rule is valid and (ii) adding a new rule with a range of valid packet processing table versions that begins with a next packet processing table version; and
   incrementing a current version number of the packet processing tables to a new version number to commit the modifications such that the new version number is outside the range for existing rules to be removed and within the range for newly added rules.

2. The method of claim 1, wherein the update is received from a network controller as a bundle of modifications to be performed together, wherein all of the modifications in the bundle are applied to the packet processing tables before the modifications are committed by incrementing the current version number of the packet processing tables.

3. The method of claim 1, wherein the update is received from an action specified by a matched rule in one of the packet processing tables.

4. The method of claim 1, wherein the range of packet processing table versions for each rule is specified by an addition version number that indicates the packet processing table version in which the rule is initially valid and a removal version number that indicates the packet processing table version in which the rule is initially no longer valid.

5. The method of claim 4, wherein the update requires addition of a new rule, wherein modifying the packet processing tables comprises adding the new rule with an addition version number of the new incremented packet processing table version number and a removal version number of a maximum packet processing table version number.

6. The method of claim 5, wherein the maximum packet processing table version number is a large enough number that the maximum packet processing table version will not be reached.

7. The method of claim 4, wherein the update requires removal of an existing rule, wherein modifying the packet processing tables comprises modifying the removal version number of the existing rule to be the new incremented packet processing table version number.

8. The method of claim 4, wherein the update requires modification of an existing rule, wherein modifying the packet processing tables comprises:
   modifying the removal version number of an existing entry for the rule to be the new incremented packet processing table version number; and
   adding a new entry for the rule with the modifications to the existing entry for the rule, the new entry having an addition version number of the new incremented packet processing table version number and a removal version number of a maximum packet processing table version number.

9. The method of claim 8, wherein modifying the packet processing tables further comprises copying statistics for the existing entry for the rule to the new entry for the rule.

10. The method of claim 9, wherein modifying the packet processing tables further comprises establishing a link from the statistics of the existing entry for the rule to the copied statistics of the new entry for the rule for any future statistics received for the existing entry.

11. The method of claim 1 further comprising:
    receiving a packet to process through the set of packet processing tables; and
    assigning a current version number of the packet processing tables to the packet, wherein the packet is only allowed to match rules valid for the version number assigned to the packet.

12. The method of claim 11, wherein the assigned version number of the packet does not change when the current version number of the packet processing tables is incremented.

13. The method of claim 11, wherein a particular rule that is no longer valid for the current version of the packet processing tables is only removed from the packet processing tables once all packets for which the particular rule is valid have completed processing.

14. A non-transitory machine readable medium storing a program which when executed by at least one processing unit implements a managed forwarding element that processes packets through a set of packet processing tables by matching rules in the packet processing tables, the program comprising sets of instructions for:
- receiving an update that requires modification to at least one of the packet processing tables, wherein each rule in the packet processing tables is assigned a range of packet processing table versions in which the rule is valid to be used for processing packets;
- modifying the packet processing tables according to the received update by at least one of (i) ensuring an existing rule is removed by modifying the range of packet processing table versions in which the existing rule is valid such that a current packet processing table version is the last packet processing table version in which the existing rule is valid and (ii) adding a new rule with a range of valid packet processing table versions that begins with a next packet processing table version; and
- incrementing a current version number of the packet processing tables to a new version number to commit the modifications such that the new version number is outside the range for existing rules to be removed and within the range for newly added rules.

15. The non-transitory machine readable medium of claim 14, wherein the update is received from a network controller as a bundle of modifications to be performed together, wherein all of the modifications in the bundle are applied to the packet processing tables before the modifications are committed by incrementing the current version number of the packet processing tables.

16. The non-transitory machine readable medium of claim 14, wherein the range of packet processing table versions for each rule is specified by an addition version number that indicates the packet processing table version in which the rule is initially valid and a removal version number that indicates the packet processing table version in which the rule is initially no longer valid.

17. The non-transitory machine readable medium of claim 16, wherein the update requires addition of a new rule, wherein the set of instructions for modifying the packet processing tables comprises a set of instructions for adding the new rule with an addition version number of the new incremented packet processing table version number and a removal version number of a maximum packet processing table version number.

18. The non-transitory machine readable medium of claim 16, wherein the update requires removal of an existing rule, wherein the set of instructions for modifying the packet processing tables comprises a set of instructions for modifying the removal version number of the existing rule to be the new incremented packet processing table version number.

19. The non-transitory machine readable medium of claim 15, wherein the update requires modification of an existing rule, wherein the set of instructions for modifying the packet processing tables comprises sets of instructions for:
- modifying the removal version number of an existing entry for the rule to be the new incremented packet processing table version number; and
- adding a new entry for the rule with the modifications to the existing entry for the rule, the new entry having an addition version number of the new incremented packet processing table version number and a removal version number of a maximum packet processing table version number.

20. The non-transitory machine readable medium of claim 19, wherein the set of instructions for modifying the packet processing tables further comprises sets of instructions for:
- copying statistics for the existing entry for the rule to the new entry for the rule; and
- establishing a link from the statistics of the existing entry for the rule to the copied statistics of the new entry for the rule for any future statistics received for the existing entry.

21. The non-transitory machine readable medium of claim 14, wherein the program further comprises sets of instructions for:
- receiving a packet to process through the set of packet processing tables; and
- assigning a current version number of the packet processing tables to the packet, wherein the packet is only allowed to match rules valid for the version number assigned to the packet.

22. The non-transitory machine readable medium of claim 21, wherein the assigned version number of the packet does not change when the current version number of the packet processing tables is incremented.

23. The non-transitory machine readable medium of claim 21, wherein a particular rule that is no longer valid for the current version of the packet processing tables is only removed from the packet processing tables once all packets for which the particular rule is valid have completed processing.

24. The non-transitory machine readable medium of claim 14, wherein the managed forwarding element is a flow-based managed forwarding element, the packet processing tables are flow tables, and the rules are implemented as flow entries in the packet processing tables.

\* \* \* \* \*